United States Patent [19]

Rajnert

[11] 4,347,793
[45] Sep. 7, 1982

[54] COUNTER TOP AND CONSTRUCTION

[76] Inventor: Edward Rajnert, Box 325, Pine Island, N.Y. 10969

[21] Appl. No.: 197,131

[22] Filed: Oct. 15, 1980

[51] Int. Cl.³ .......................................... A47B 13/08
[52] U.S. Cl. .................................... 108/27; 156/212; 156/258
[58] Field of Search .................. 108/27; 312/140.1; 156/258, 212

[56] References Cited

U.S. PATENT DOCUMENTS 2,186,530  1/1940  Jones ............................. 156/212 X
3,012,833  12/1961  Harris et al. ..................... 108/27 X
3,606,508  9/1971  Burnes .............................. 108/27 X

FOREIGN PATENT DOCUMENTS 55-132213  10/1980  Japan .................................. 156/212

Primary Examiner—William E. Lyddane
Attorney, Agent, or Firm—Diller, Ramik & Wight

[57] ABSTRACT

A counter top structure and method of making same, the structure having a base assembly which consists of a counter top base, upright backsplash bases and filler members joining the several bases, cumulatively to provide an essentially continuous or uninterrupted surface to which a sheet of synthetic thermoplastic material is bonded, and where an inside corner between backsplashes is permitted to be formed by the provision of a single arcuate cut in the sheet such that the sheet portion on one backsplash base abuts the convex edge, provided by the cut, of the sheet portion carried by the other backsplash base.

11 Claims, 6 Drawing Figures

COUNTER TOP AND CONSTRUCTION

BACKGROUND OF THE INVENTION

Counter top assemblies generally used in household installation usually have a base structure covered by a suitable laminate presenting a flat horizontal counter surface and a vertical upright surface at the rear known as a backsplash. Various ways of constructing counter tops of this type have been attempted with lesser and greater degrees of success. One of the basic problems has been the difficulty of forming the synthetic laminates, commonly used today, into the proper surface configuration so as to provide a continuous surface area with a minimum of seams. This problem is compounded when a second or third side backsplash is included which presents an inside corner between backsplashes to which the laminate must be formed. The present invention provides a solution to this problem.

BRIEF SUMMARY OF THE INVENTION

The present invention involves a counter top assembly which has at least one such inside corner between two backsplashes. A single synthetic thermoplastic sheet is bonded to a counter surface base and at least two backsplash strips which serve as individual base members for the backsplashes. These base members are dimensioned to the required counter surface size and backsplash height and length. The sheet, curved upwardly between the base and each backsplash strip, has a single cut between the backsplashes such that only one seam is present at any inside corner juncture. The base structure is so constructed as to provide substantially uniform and continuous support or back-up of the sheet, even in the curved regions thereof.

To make the counter top assembly, a planar subassembly is formed in which the backsplash strips, in coplanar relation to the base and spaced parallel to respective straight adjacent edges of the base, and the base are bonded to a single flat synthetic thermoplastic sheet. A single arcuate cut is provided in the flat sheet extended from approximately the corner of the base outwardly between the backsplash strips where the inside corner is to be formed. The arcuate cut divides the sheet overlying the backsplash strips into two portions, giving one portion a convex edge at the corner juncture.

To form the subassembly into the final assembly, the sheet portion having the convex edge is then bent upwardly to its backsplash position by heating the area of the sheet spanning the space between the edge of the base and the backsplash strip and forming it to an arcuate curve. A molding strip is bonded to the base, backsplash strip and arcuate underside of the sheet, thereby to join the base and backsplash rigidly while also "backing up" the curved surface of the sheet.

The other sheet portion is then heated and bent in a similar fashion such that its curved, backsplash surface is contoured to abut the convex edge presented by the already positioned first backsplash.

Thus, an inside corner is formed between the backsplashes with a single seam and from a single sheet of laminate. Further inside corners may be formed by providing further backsplash strips and arcuate cuts.

Exposed edges of the backsplash strips and base, dependent on the particular installation requirements, may be faced with the sheet laminate by conventional methods.

DETAILED DESCRIPTION OF THE DRAWINGS

DETAILED DESCRIPTION OF THE INVENTION

Figure 1:
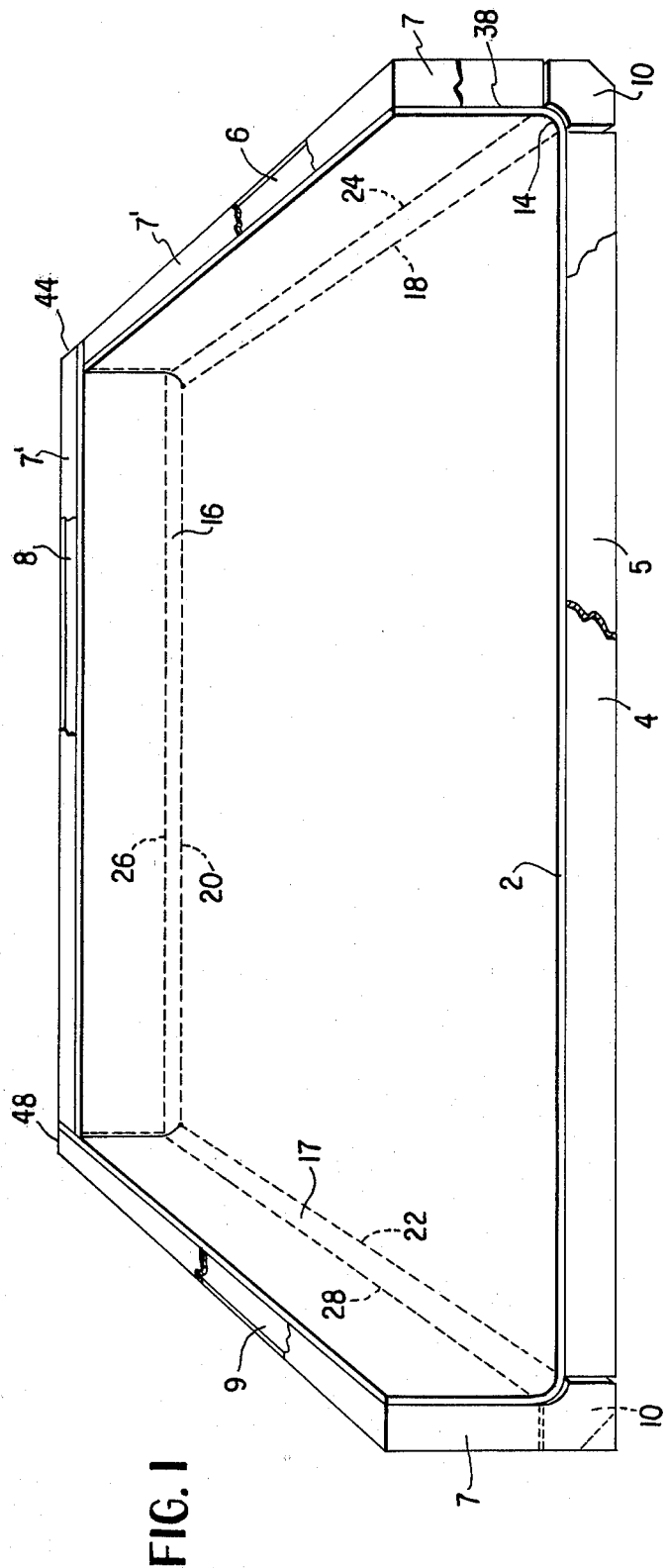
FIG. 1 represents a perspective view of a basic counter top assembly having two inside corners.

To illustrate the finished counter structure formed by the method of construction herein after described, a basic structure, having two inside corners, is depicted in FIG. 1. The base 4 is rectangular in shape having a rear edge 20, a right edge 18 and a left edge 22. Upright backsplash strips 8, 6, 9 are aligned with these edges and are perpendicular to the base 4. The front edge of the base 4 is shown to be straight, but may be of any suitable configuration, and may be finished in conventional fashion with a separate facing sheet or strip 5, as shown, with the remaining front surface portions of the assembly being faced with further strips, one of which is illustrated at 7. The base 4 and backsplash strips 6, 8 and 9 may be made of particle board or the like, having suitable strength and rigidity properties to act as a support base for the counter.

The sheet 2 covers and is bonded to the base 4 and the backsplash strips 6, 8, 9 with curved backsplash areas 14, 16 and 17 spanning the gaps between the base 4 and the corresponding backsplash strips 6, 8, 9. The sheet 2 is a thermoplastic material, such as Formica or the like, commonly used in the trade for counter covering, which may be bent or curved by applying heat and proper mechanical stress to the area of the sheet where the bend is desired, as hereinafter described.

The filler or molding pieces 10 are also bonded to the sheet 2 along its curved areas 14, 16, 17 and to the base 4 and corresponding backsplash strips 6, 8, 9 so as to provide a unified structural base for the counter and to provide a rigid support or back-up for the curved areas of the sheet. Although the joints between the various base components are illustrated in gapped fashion for the purpose of clarity, it is to be understood that these bonded joints are tight and provide not only a unified, rigid structure but also are which provides an essentially continuous support or back-up surface for the sheet 2 even in the critical curved areas 14, 16 and 17. The molding pieces 10 should have similar strength and rigidity properties as the base 4 and the strips 6, 8, 9 and a wood material, which is also easily shaped to conform to the curved areas 14, 16, 18 of the sheet 2, is suitable.

Figure 2:
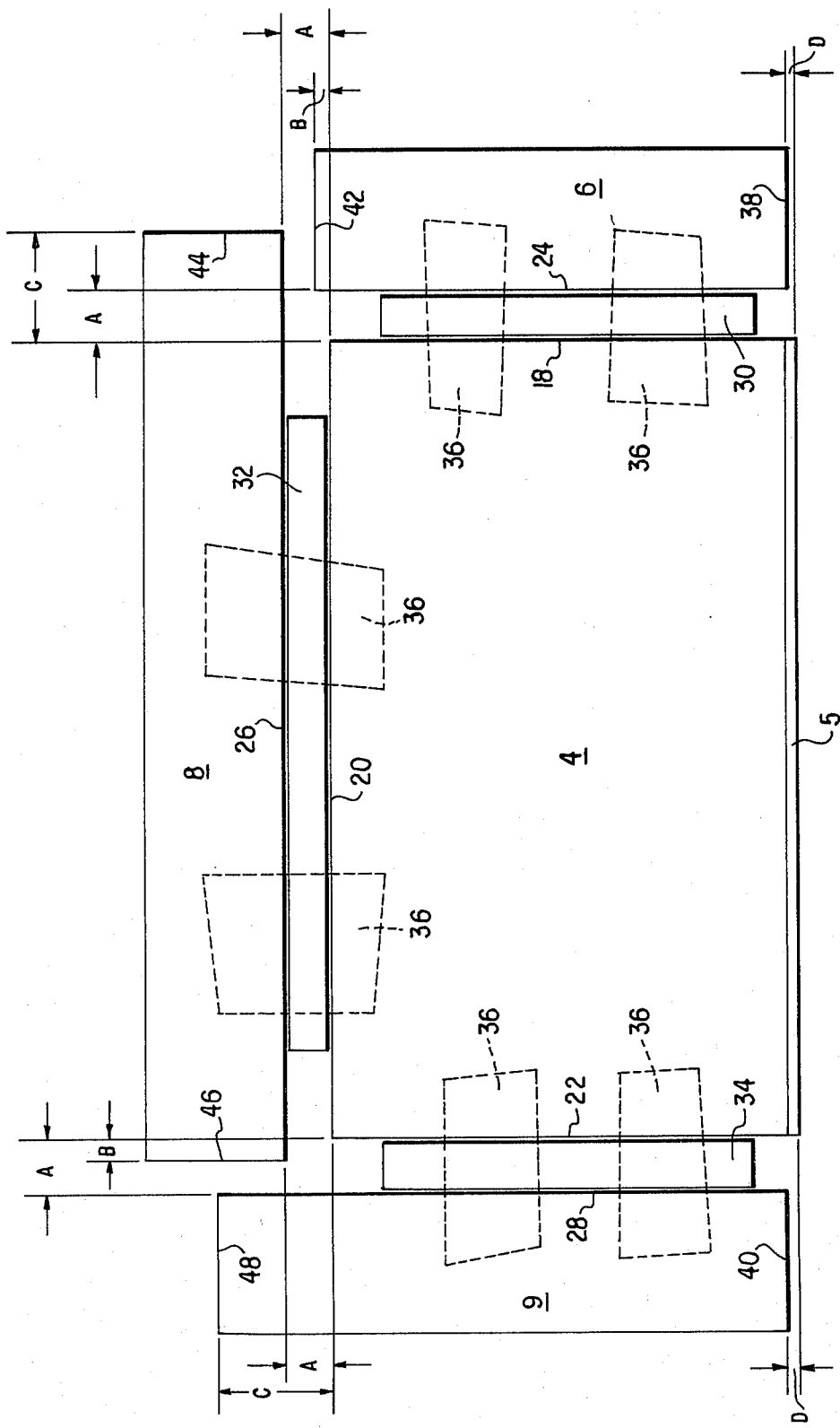
FIG. 2 is a plan view of the base and backsplash strips in coplanar relationship.

In constructing an assembly such as is shown in FIG. 1, the initial step is to position the backsplash strips 6, 8, 9 in coplanar relation to the base 4 as shown in FIG. 2. The backsplash strips 6, 8, 9 have similar thickness as the base 4 and are aligned with the base 4 each having one edge 24, 26, 28 in spaced parallel relation at a distance, dimension A, to corresponding edges 18, 20, 22 of the base, utilizing spacers 30, 32, 34 having the required width, dimension A. The positioning is temporarily maintained by plates 36 fastened to the surfaces of the base and the backsplash strips opposite those to which the sheet is to be bonded. The spacers 30, 32, 34 and plates 36 can be of any material which will temporarily space and maintain the base and backsplash strips in position. The spacers and plates will be removed just prior to the bending of the sheet.

The width of the backsplash strips is determined by the height requirements for the backsplash portions of the counter top. The length of the two side backsplash strips 6, 9 should extend to the front edge of the base 4, leaving a distance, dimension D, between the front end 38, 40 of these strips 6, 9, and the front surface of the facing sheet 5 already bonded to the front edge of the base 4. This distance, dimension D, is the thickness of the sheet 5 such that when the side backsplash strips 6, 9 are in final position, their front ends 38, 40 may be faced to be flush with the front surface of the facing sheets 5 and 7. The outside edges of the backsplash strips 6, 8 and 9 are also faced with sheet material strips 7 in a fashion similar to the front edge of the base 4, as these outside edges will become the top surfaces of the backsplash portions when in final position.

Figure 3:
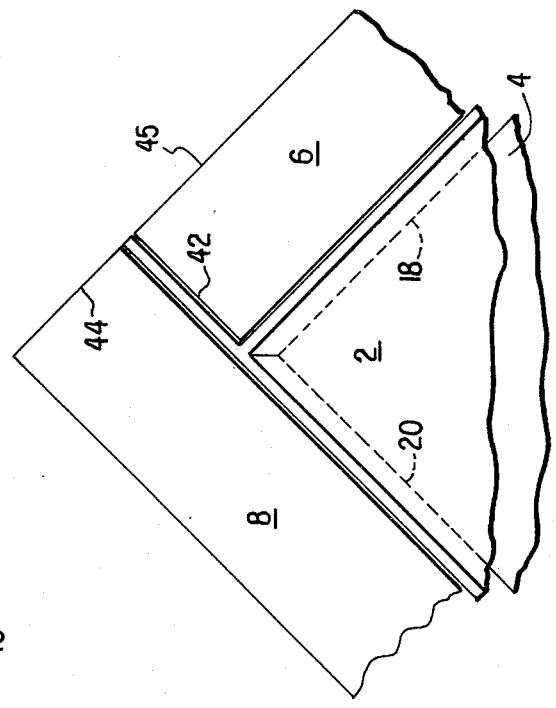
FIG. 3 is a detail of one corner of the counter top assembly.

The rearward edge 42 of the right backsplash strip 6 extends beyond the rear edge 20 of the base by an amount, dimension B, such that when the backsplash strips 6, 8 are in final position, as shown in FIG. 3, the rearward edge 42 abuts against the surface of the sheet 2 covering backsplash strip 8. The left end 46 of the rear backsplash strip 8 extends beyond the left edge 22 of the base 4 in similar fashion.

The right edge 44 of the rear backsplash strip 8 extends beyond the right edge 18 of the base 4 by an amount, dimension C, such that when the backsplash strips 6, 8 are in final position, the right edge 44 is flush with the rear face 45 of the right backsplash strip 6, as shown in FIG. 3. The rear edge 48 of the left backsplash strip 9 extends beyond the rear edge 20 of the base 4 in similar fashion.

Figure 4:
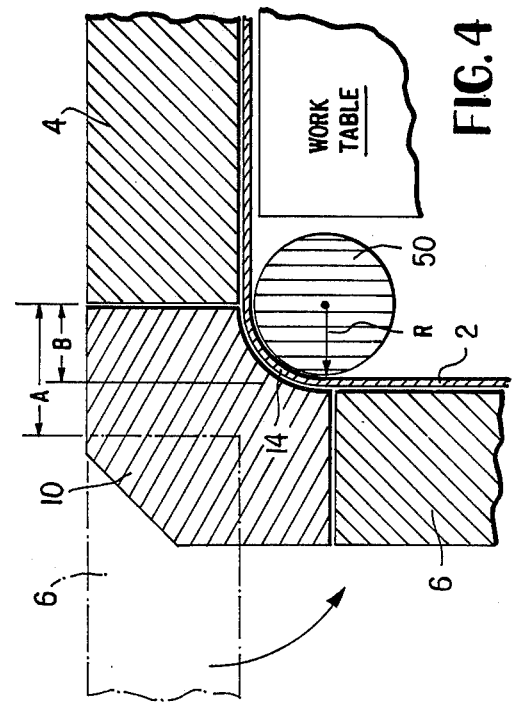
FIG. 4 is a cross sectional view of the curved portion of the counter top assembly.

The distance, dimension B, which the ends 42, 46 of the right and rear backsplash strips 6, 8 extend beyond the respective edges 20, 22 of the base 4 is dependent upon the radius R, of the bend to be put in the sheet 2, and the thickness of the sheet 2 itself, which the ends 42, 26 will abut when the backsplashes are in final position, as shown in FIGS. 3 and 4. The distance, dimension A, between the edges 18, 20, 22 of base 4 and the corresponding backsplash strips 6, 8, 9 is also dependent on this radius, R, as it becomes the arc length of the curved area 14, 16, 18.

Figure 6:
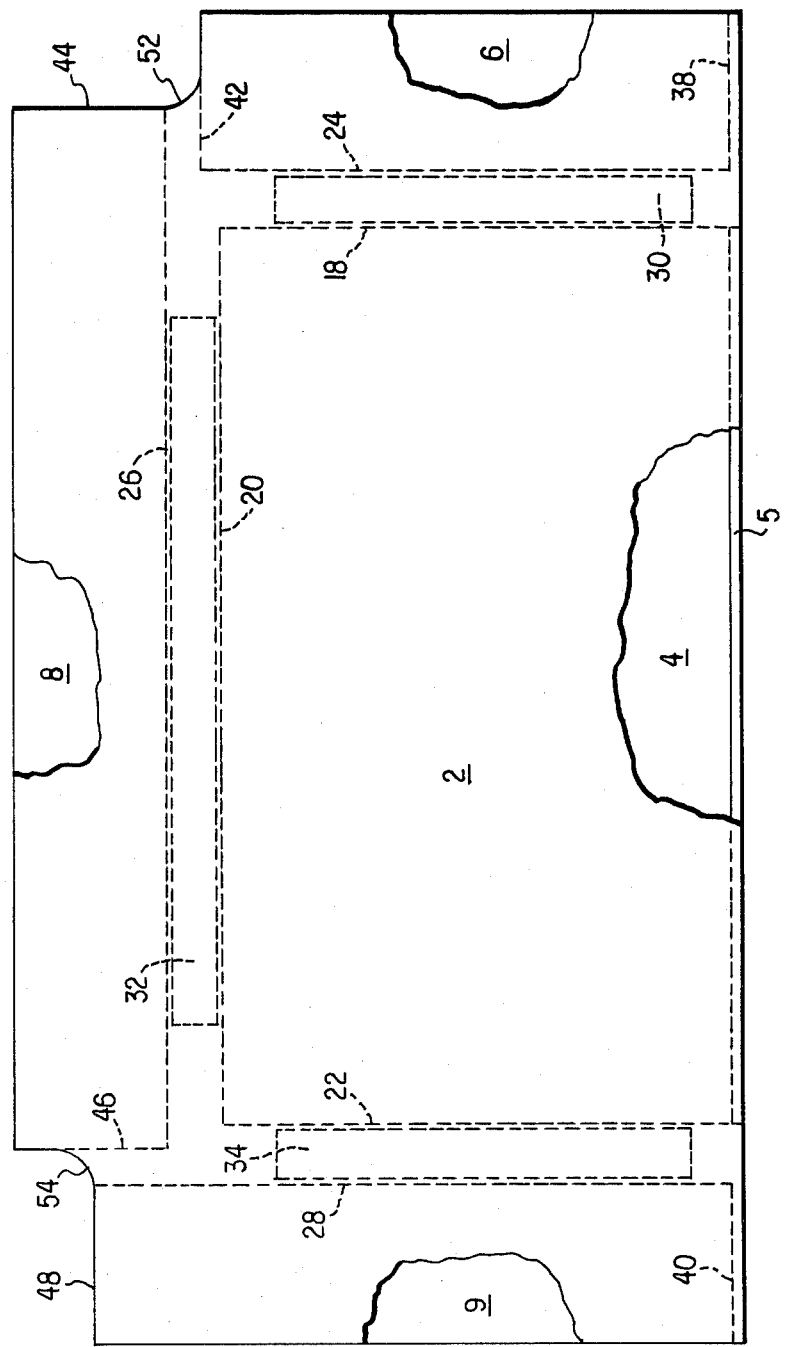
FIG. 6 is a plan view of the counter top subassembly.

Subsequent to positioning and retaining the base and backsplash strips, a single flat sheet 2 of Formica is bonded to their upper surfaces, as shown in FIG. 6, the spacers 30, 32, 34 being unbonded and thus free so that they may later be removed. The sheet 2 is routed, after bonding, to conform to the outer surfaces of the facing strips 7' on the backsplash strips 6, 8, 9, the rear and right edges 48, 44, of the left and rear backsplash strips 9 and 8, respectively, and the surface of the facing sheet 5 on the front edge of the base 4. The front edge of the sheet 2, as routed, extends over the front edges 38, 40 of the side backsplash strips 6, 9 to allow these ends later to be faced with the strips 5 and 7 (see FIG. 1). The rear and left edges 42, 46 of the right and rear backsplash strips 6, 8, respectively, partially conform to the routed edges of the sheet 2 up to the point where the other backsplash strip ends overlap them, where the router forms small arcuate edges 52, 54 of the sheet 2 therebetween, see FIG. 6.

Figure 5:
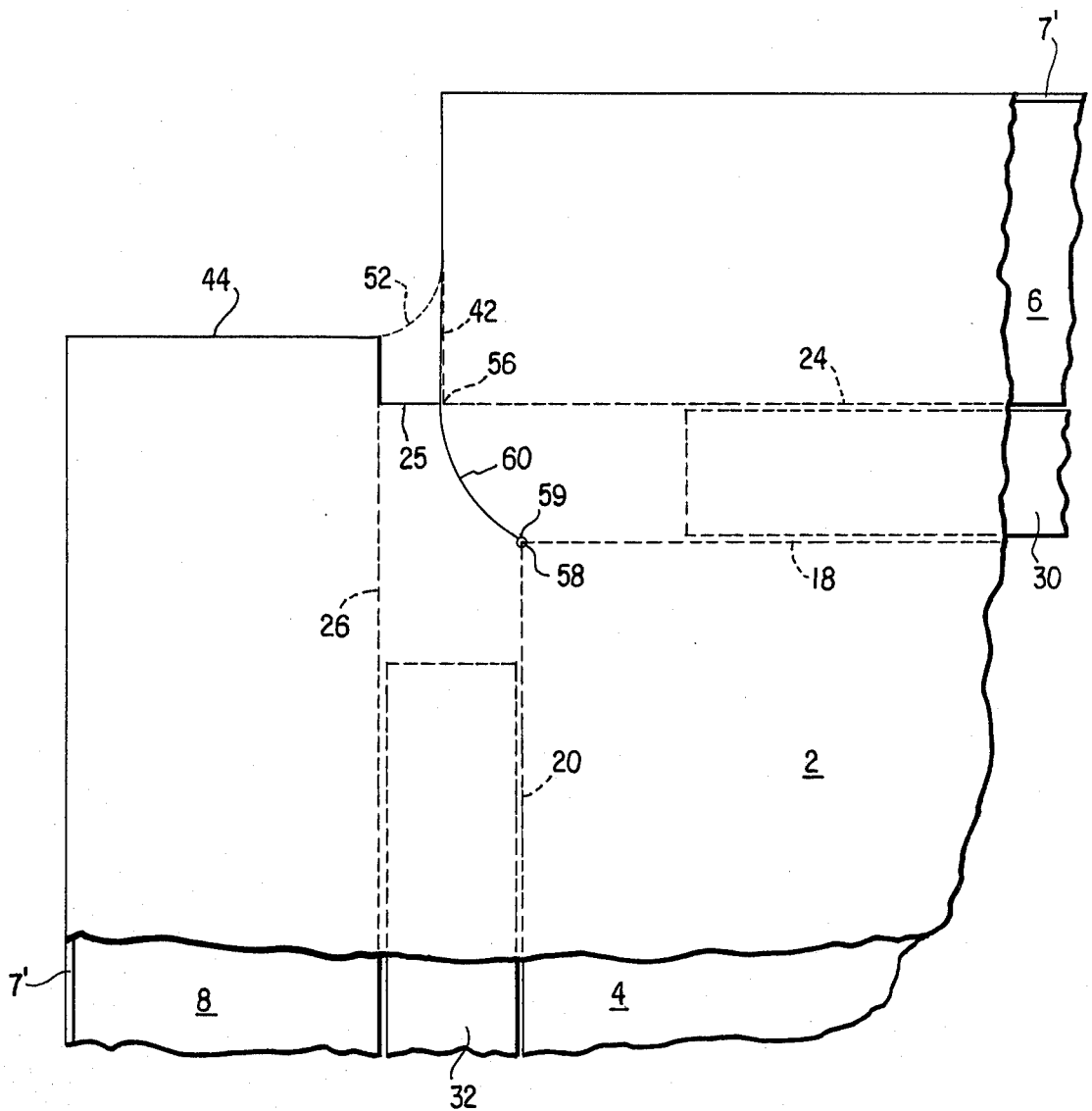
FIG. 5 is a detail of the corner of the counter top subassembly.

Referring now to FIG. 5, for sake of clarity, the formation of one corner will be discussed with the understanding that the other corner will be formed in a similar fashion. The area of the sheet 2 bounded by the edge 42 of the right backsplash strip 6, the arcuate edge 52 of the sheet 2, a portion of the edge 26 of the rear backsplash strip 8 and along an extension of the edge 24, of the backsplash strip 6, as designated at 25, is cut away. An arcuate cut 60 is then cut in the sheet 2 from the corner 56 of the backsplash strip 6 to the corner 58 of the base 4 where a small hole 59 is drilled. This cut 60 may be made in the sheet 2 with a jigsaw or saber saw having a blade thickness of approximately 1/32 of an inch. The cut 60 divides the sheet 2, overlying the backsplash strips into separate backsplash portions. One such portion of the sheet 2 extends outwardly from the edge 18 of the base 4 and covers the backsplash strip 6 and has a convex edge formed by the cut 60 and another portion which extends outwardly from the edge 20 of the base 4 and covers the backsplash strip 8 and has a concave edge formed by the cut 60.

The arcuate cut 60 is shaped such that when the backsplashes are in final position, the convex edge, provided by the cut, intersects and abuts, throughout its entire arc length, the curved surface of the adjacent backsplash portion. The shape of the cut 60 is determined by the radius, R, of the curved portions of the sheet. The cut 60 must be initially shaped such that when the sheet portion which carries the convex edge is subsequently curved with the radius, R, it presents the convex edge to intersect and abut the adjacent curved surface having a similar radius, R. The cutting of the sheet 2 with the cut 60 of the proper shape may be facilitated by the use of a template having the proper arcuate shape. Each corner is arcuately cut and cut away in a similar fashion.

The subassembly of the sheet 2, base 4 and the backsplash strips 6, 8, 9 is now ready for final positioning of the backsplash portions. The retainer plates 36, not shown in FIG. 6, and spacers 30, 32, 34 are removed. The sheet which spans the gaps between the base and corresponding backsplash strips is heated and bent with the curve having the required radius, R, to sequentially position first the backsplash strip 6, then the backsplash strip 8 and finally the backsplash strip 9 to be perpendicular to the base as shown in FIG. 1. By following this sequence, the convex edge of each corner juncture is positioned first and then the surface of the adjacent portion is abutted against this edge.

The heating and bending of the sheet 2 is carried out by inverting the subassembly on a work table with the backsplash portion overhanging a copper heat bar 50 having the required radius, R, as shown in FIG. 4. The heat bar 50 has a heating coil running through its center which is thermostatically controlled to a temperature sufficient to make the sheet 2 become flexible as it comes in contact with the heat bar 50. The backsplash portion of sheet 2 is gradually pushed downward from its initial position, the dashed lines in FIG. 4, until the backsplash strip 6 is at a 90° angle to the base 4.

The curved area 14 of the sheet is formed on the circumferential surface of the heat bar 50. After the bend is formed, the molding piece 10 is bonded in place to the sheet 2, base 4 and the backsplash strip 6.

The rear and the left backsplash portions are then treated in similar fashion. The facing strips 7 may then be applied.

Any small gap or hole left by reason of incomplete "closing" of the holes 59 may then be filled with a suitable putty or plastic of a color to match the sheet material.

It will be understood that the invention is not limited to the counter top assembly as depicted herein which is but one of many possible configurations the assembly may take. The shape and finish of the front edge of the counter may be varied, as well as the top edges of the backsplashes, as design and installation requirements dictate. The interior portions of these surfaces and the number of backsplash surfaces may be varied to accommodate various fixtures or fittings of particular installations. These and other changes could be made to the counter top assembly as shown without departing from the spirit and scope of the invention.

What is claimed is:

1. The method of making a counter top assembly having at least one inside corner which comprises the steps of:
    (a) providing a flat base having a plan view form of a particular configuration having at least one corner defined at the intersection of first and second straight edges;
    (b) positioning first and second backsplash strips coplanar with said base, said first backsplash strip in spaced parallelism with said first straight edge and said second backsplash strip in spaced parallelism with said second straight edge;
    (c) bonding a flat sheet of synthetic thermoplastic material to said base and said strips;
    (d) cutting said sheet along a line which extends approximately from said one corner of said base arcuately outwardly between said backsplash strips to the perimeter of said sheet whereby to divide that margin of said sheet overlying said backsplash strips into first and second backsplash portions each defined between one of said straight edges of said base outwardly to the perimeter of said sheet, the cut providing a convex edge for said first backsplash portion and a concave edge for said second backsplash portion;
    (e) heating the area of said first backsplash portion of said sheet which bridges the span between the first edge of said base and said first backsplash strip and bending such heated area in an arc such that said first backsplash strip is disposed substantially perpendicular to and above the plane of said base; and
    (f) heating the area of said second backsplash portion of said sheet which bridges the span between the second edge of said base and said second backsplash strip and bending such heated area arcuately such that the bent surface of said heated area of said second backsplash portion intersects and abuts said convex edge of said first backsplash portion bent in step (e) to form an inside corner.

2. The method of making a counter top assembly having at least one inside corner as claimed in claim 1 wherein said flat base is provided with a second corner defined at the intersection of said second straight edge and a third straight edge, including the steps of positioning a third backsplash strip coplanar with said base and in spaced parallelism with said third straight edge of said base, said flat sheet being bonded to said third backsplash strip, forming a second cut in said sheet which extends along a line approximately from said second corner of said base arcuately outwardly between said second backsplash strip and said third backsplash strip to the perimeter of said sheet whereby to further divide that margin of said sheet overlying said backsplash strips to form a third backsplash portion defined between said third straight edge of the base outwardly to the perimeter of said sheet, said second cut providing a convex edge for said second backsplash portion and a concave edge for said third backsplash portion, heating the area of said third backsplash portion of said sheet which bridges the span between said third straight edge of said base and said third backsplash strip and bending such heated area arcuately such that the bent surface of said heated area of said third backsplash portion intersects and abuts said convex edge of said second backsplash portion in step (f) to form another inside corner.

3. The method of making a counter top assembly having at least one inside corner as claimed in claim 1 wherein step (b) includes placing spacers at least one against each of said first and second straight edges of said base and then placing said backsplash strips against said spacers to facilitate the spaced parallel positioning of respective backsplash strips with corresponding straight edges of said base.

4. The method of making a counter top assembly having at least one inside corner as claimed in claim 3 wherein step (b) further includes temporarily joining the base to the backsplash strips with retainers bridging said spacers and fastened to said base and said backsplash strips and including removal of said retainers prior to heating and bending of said sheet.

5. The method of making a counter top assembly having at least one inside corner as claimed in claim 1 wherein subsequent to bending the sheet, moulding pieces, joining the respective backsplash strips with the base and conforming to the bet sheet therebetween, are bonded to said backsplash strips, said base and said sheet therebetween.

6. The method of making a counter top assembly having at least one inside corner as claimed in claim 1 wherein a hole is drilled in said sheet at said one corner of said base from which said cut extends.

7. The method of making a counter top having at least one inside corner which comprises the steps of:
    (a) providing a subassembly comprising a base having a plan view form of a particular configuration having at least one inside corner with first and second adjacent straight edges, having first and second backsplash strips coplanar with said base and each backsplash strip in spaced parallelism with respective first and second adjacent straight edges and including a flat sheet of synthetic thermoplastic material bonded to said base and said backsplash strips, there being a cut in said sheet which extends approximately from said one corner of said base arcuately outwardly between said first and second backsplash strips to the perimeter of said sheet, said cut dividing the margin of said sheet overlying said backsplash strips into first and second backsplash portions each defined between one of said straight edges of the base outwardly to the perimeter of said sheet, said cut providing a convex for the first backsplash portion and a concave edge for the second backsplash portion;
    (b) sequentially positioning the first backsplash portion and then the second backsplash portion by heating the respective areas of said sheet which bridge the spans between the straight edges of said base and the corresponding backsplash strips and bending the heated areas in an arc such that the backsplash strips are disposed substantially perpendicular to and above said base and the heated area of the second backsplash portion arcuately bends to intersect and abut said convex edge of said first backsplash portion.

8. A counter top assembly having at least one inside corner comprising in combination:
   a base having a plan view form of a particular configuration having at least one corner with first and second adjacent straight edges;
   backsplash strips substantially perpendicular to and above said base and in spaced parallelism with respective said first and second adjacent straight edges;
   a sheet of synthetic thermoplastic material bonded to said base and said backsplash strips and curved throughout the areas which span the spaces between each said first and second adjacent straight edges of said base and the corresponding said backsplash strips, the sheet being arcuately cut along a line from said one corner of said base so as to provide a convex edge for the sheet portion curved and overlying one backsplash strip which intersects and abuts the surface of the sheet portion curved and overlying the other backsplash strip to form an inside corner juncture.

9. A counter top subassembly comprising in combination:
   a base having a plan view of a particular configuration having at least one corner with first and second adjacent straight edges;
   first and second backsplash strips coplanar with said base, said first backsplash strip in spaced parallelism with said first straight edge and said second backsplash strip in spaced parallelism with said second straight edge;
   a flat sheet of synthetic thermoplastic material bonded to said base and said backsplash strips, said flat sheet having a cut which extends along a line approximately from said one corner of said base arcuately outwardly between said first and second backsplash strips to the perimeter of said sheet, said cut dividing that margin of said sheet overlying said backsplash strips into first and second backsplash portions each defined between one of said straight edges of said base outwardly to the perimeter of said sheet, said cut providing a convex edge for said first backsplash portion and a concave edge for said second backsplash portion.

10. The method of making a counter top assembly having at least one inside corner which comprises the steps of:
    (a) providing a flat base having a plan view form of a particular configuration having at least one corner defined at the intersection of first and second straight edges;
    (b) positioning first and second backsplash strips coplanar with said base, said first backsplash strip being in spaced parallelism with said first straight edge and having an end extending slightly beyond said corner and said second backsplash strip being in spaced parallelism with said second straight edge and having an end extending not only beyond said corner but also in overlapping, spaced relation to said end of said first backsplash strip;
    (c) bonding a flat sheet of synthetic thermoplastic material to said base and said strips;
    (d) routing said sheet at least along said ends of the backsplash strips and cutting away a portion of the sheet bounded by the routed outline thereof, the end edge of the first backsplash strip, the inner edge of the second backsplash strip and an extension of the inner edge of the first backsplash strip from a corner of said end thereof to said inner edge of the second backsplash strip;
    (e) cutting said sheet along a line which extends arcuately from said corner of the first backsplash strip and tangential to said end thereof to said one corner of said base whereby to divide that margin of said sheet overlying said backsplash strips into first and second backsplash portions each defined between one of said straight edges of said base outwardly to the perimeter of said sheet, the cut providing a convex edge for said first backsplash portion and a concave edge for said second backsplash portion and drilling a hole through said sheet at said corner of the base;
    (f) heating the area of said first backsplash portion of said sheet which bridges the span between the first edge of said base and said first backsplash strip and bending such heated area in an arc such that said first backsplash strip is disposed substantially perpendicular to and above the plane of said base;
    (g) heating the area of said second backsplash portion of said sheet which bridges the span between the second edge of said base and said second backsplash strip and bending such heated area arcuately such that the bent surface of said heated area of said second backsplash portion intersects and abuts said convex edge of said first backsplash portion bent in step (e) to form an inside corner; and
    (h) bonding filler back-up members to said sheet, base and backsplash strips to provide face-to-face back-up for said curved portions of the sheet while rigidly joining said base and backsplash strips.

11. A prefabricated counter top unit having at least one inside corner, comprising in combination:
    a base structure providing a rigid, substantially continuous support surface including a generally flat horizontal portion rising through at least two curved portions to respective adjacent generally flat vertical portions, said vertical portions defining an inside corner;
    a single sheet of synthetic thermoplastic material bonded throughout in face-to-face contact with said support surface, said vertical portions of the sheet being in abutting relation at said inside corner and said curved portions being severed from each other along an arcuate line of severance leading from said horizontal portion to said inside corner such that said sheet substantially continuously covers said support surface.

* * * * *